Aug. 16, 1932.                L. L. HOWARD                 1,872,143
           MOLDED MICA PRODUCT AND METHOD OF MAKING SAME
                   Filed Sept. 1, 1928      2 Sheets-Sheet 1
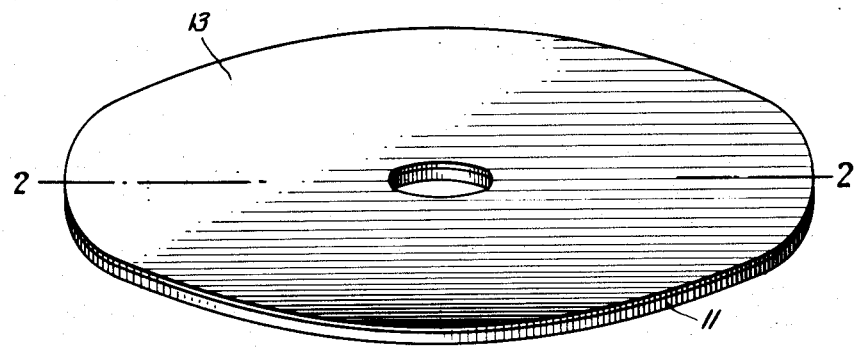
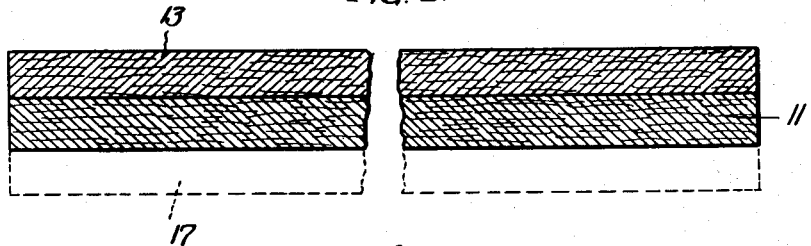
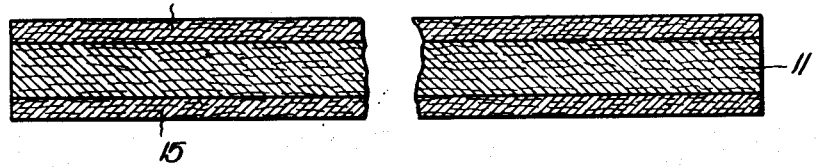
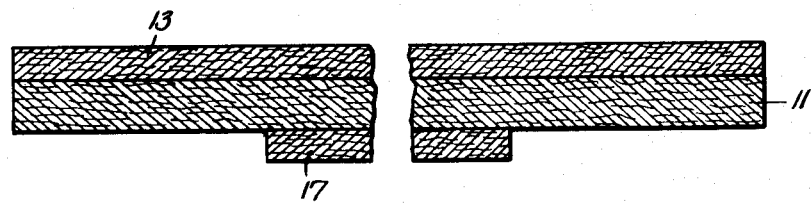
INVENTOR:
LEONARD L. HOWARD,
BY: Cheever & Cox
                ATTYS.

Aug. 16, 1932.    L. L. HOWARD    1,872,143
MOLDED MICA PRODUCT AND METHOD OF MAKING SAME
Filed Sept. 1, 1928    2 Sheets-Sheet 2
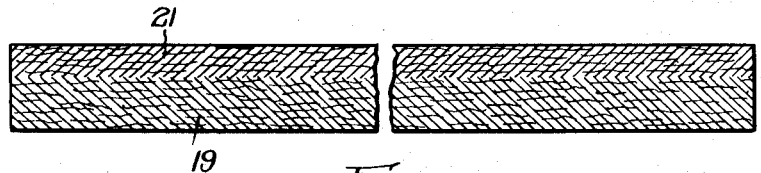
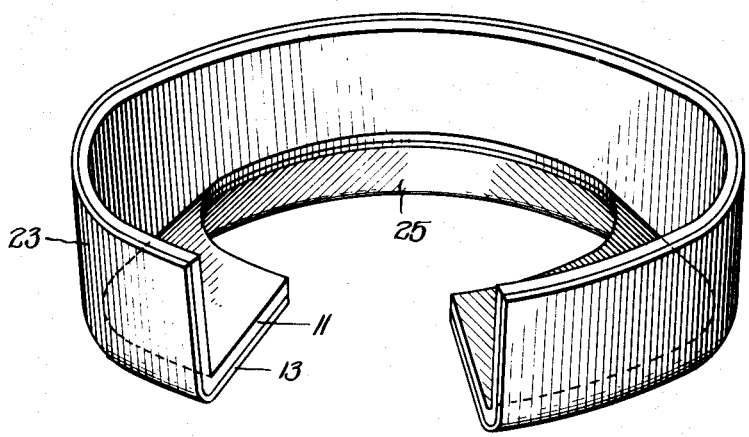
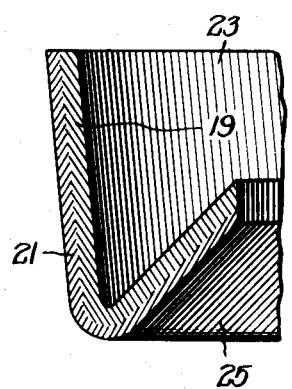 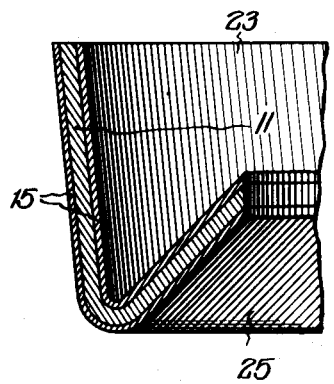 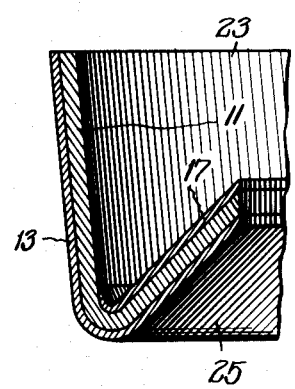
INVENTOR:
LEONARD L. HOWARD,
BY: Cheever & Cox
ATTYS.

Patented Aug. 16, 1932

1,872,143

UNITED STATES PATENT OFFICE

LEONARD L. HOWARD, OF VALPARAISO, INDIANA, ASSIGNOR, BY MESNE ASSIGNMENTS, TO CONTINENTAL DIAMOND FIBRE COMPANY, OF NEWARK, DELAWARE, A CORPORATION OF DELAWARE

MOLDED MICA PRODUCT AND METHOD OF MAKING SAME

Application filed September 1, 1928. Serial No. 303,433.

My invention relates in general to a molded mica product and method of making the same and has more particular reference to improved method of forming commutator rings of the type illustrated and described in United States Patent No. 1,589,464, issued to Louis T. Frederick June 22, 1926 and the co-pending application Serial Number 102,820 filed April 17, 1926 by Louis T. Frederick, said patent and application having been assigned to the assignee of this application.

Mica products of this general character are formed by molding discs of mica plate which is a known article consisting of mica flakes bonded together by shellac or other suitable binder. Such material is plastic when heated and may be given a desired conformation by suitably configurating the material in a mold, the molding being permitted by the slippage of the superposed flakes upon each other due to the condition of the binder when the material is heated.

Mica insulation rings for commutators are frequently subjected to severe operating conditions, particularly when used as a part of an electric motor or generator which is frequently overloaded, such overloading causing the device to heat up. In assembling commutators also, especially in the tinning operation, the insulating ring is frequently subjected to temperatures sufficiently high to cause slippage of the mica flakes of which they are formed, and, during the clamping operation, the insulating ring is subjected to considerable pressure which has a tendency to force the mica flakes to slip out of place.

An important object of my present invention is to overcome the foregoing defect and to provide mica products in which the internal slippage of the mica flakes comprising the product may be reduced to a minimum.

Another important object of my present invention is to provide a method of making commutator rings having a high degree of strength and highly resistant to mechanical deterioration at the high temperatures and pressures to which they may be subjected in service.

Numerous other objects and advantages will be apparent from the following description which, taken in connection with the accompanying drawings, discloses a preferred embodiment of the invention.

Referring to the drawings:

Figure 1 is a perspective view of a sheet of material from which commutator insulating rings having improved characteristics may be formed;

Figure 2 is an enlarged cross-section taken substantially along the line 2—2 in Figure 1 to illustrate the arrangement and formation of the blank;

Figure 3 is a similar view illustrating a modified sheet;

Figure 4 is a cross-section of a blank for making commutator rings which illustrates an application of the principles of my invention;

Figure 5 is a cross-section illustrating a modified method of making the material shown in Figures 1 and 2;

Figure 6 is a perspective view partially in cross-section of a commutator ring molded from the material illustrated in Figures 1 and 2, part of the ring being broken away to reveal its construction;

Figure 7 is a partial cross-section taken through a commutator ring of the type illustrated in Figure 6 and made of the form of material shown in Figure 5;

Figure 8 is a cross-sectional view similar to Figure 7 showing the internal construction of a commutator ring formed of the material shown in Figure 3; and Figure 9 is a cross-sectional view similar to Figure 7 showing the internal construction of a commutator ring formed of the material shown in Figure 4.

Molded mica products of the class described which have heretofore been provided, have been formed from discs of mica plate in which the bond content ranges between ten and twenty percent of the weight of the mica plate. In forming insulating rings from mica plate having such a percentage of bonding material, it is necessary to provide a blank having a total thickness considerably in excess of the thickness of the walls of the finished ring. In practice it is usual to build up a blank from a plurality of superposed preformed discs and the discs have to be accurately aligned or centered in the die during the forming operation. In forming the rings the stack of discs are compressed, and any excess material is forced out of the mold and cut off thereby at the rim of the ring. This produces a ring having a relatively high bond content which tends to become "oozy" when subjected to heat or pressure, or both, in service. By "oozy" I mean that the mica flakes comprising the product have a tendency to slip relatively to each other due to the plasticity of the binder when heated and it will be readily appreciated that when a ring becomes "oozy" its mechanical strength is reduced so that it cannot maintain its form under pressure but tends to be squeezed out of position. I have found that by reducing the bond content in the mica sheet, slipping is reduced, but if the bond content is reduced materially below ten percent, the product becomes mechanically weak and flaky and the mica flakes will not retain their molded position at the bend since they tend to flatten out. It is my purpose to provide a product able to maintain its form while at the same time having a low internal slippage characteristic. I accomplish this object by forming the ring so that it has a thin outer shell of mica having a relatively high bond content and an inner portion of relatively low bond content. In this manner I form a retaining shell which is strong enough to maintain the mechanical formation of the ring and an inner part which will not ooze.

I may form my improved product from composite sheet material either by making up a blank, as shown in Figures 1 to 4 inclusive in which a relatively thin disc 13 of high bond content is superposed upon one or more discs 11 of low bond content, or I may form the composite material directly as shown in Figure 5, wherein the lower thicker strata 19 of the sheet is of low bond content while the upper thinner strata 21 is of relatively high bond content. Such a composite material has the advantage that the material may be fed directly to a closing mold without the various disadvantages resulting from having to preform blanks consisting of superposed discs as shown in Figures 1 to 4, and the disadvantage of having to accurately place the blank in the mold.

In Figures 1 and 2, I show a blank consisting of a lower relatively thick disc 11 formed of mica plate having a relatively low bond content, that is to say, in the neighborhood of six percent binder, if common shellac is used as a bond, and an upper relatively thin reinforcing disc 13 made of mica plate having a relatively high bond content, that is to say, having upwards of ten percent binder. It will be obvious that these limits will vary depending on the binder employed, and it may be possible if certain new binders, which have been developed recently, are used that the bond content may be reduced even lower than six percent. For making ordinary commutator rings for commercial purposes, I prefer to utilize a material formed of two discs only as shown in Figure 2 of the drawings, however, the exigencies of commercial production may frequently make it desirable to form a thicker blank in which case I may add additional disc of low bond content underneath the relatively thin strengthening disc 13. In Figure 4 of the drawings I show that in making up a blank, the additional disc 17 may be smaller in diameter and thinner than the disc 11 and 13. I also contemplate the provision of material wherein the main low bond content sheet 11 is faced with sheets 15 of high bond contents, as shown in Figure 3, said sheets being thinner than the single high bond sheet 13 of Figures 1 and 2 or the single high bond strata 21 in Figure 5. When the composite material or the blanks heretofore described are molded to form a desired product, the material is positioned in the die in such a way that the thin high bond content disc or strata, as the case may be, is molded into the outer or surface portions of the molded product thus forming a retaining shell, which, on account of its high bond content will insure that the product will have a neat clean cut appearance and will hold its shape well. The inner, and preponderant portions of the product, however, will be composed of mica having a low bond content which will reduce the internal slippage of the mica and consequent "oozing" of the product in service.

In Figure 6, I have shown an insulating ring for commutators made according to my invention. In this ring, the outer portions of the body 23 and the lower portions of the inclined flange 25 comprise the high bond content disc 13 of the blank, or the high bond content strata 21 of the composite material, from which the ring is made, while the inner portions of the body 23 and the upper portions of the flange 25 comprise low bond content material. It will be apparent that the high bond content portion of the insulating ring forms a retaining shell.

By arranging a relatively thin layer of high bond content in conjunction with a relatively thicker layer of low bond content and forming the same to a desired shape, I am able to provide a molded mica product having all the advantages inherent to an exceptionally low bond content ring, that is to say, I reduce the "oozing" of the product during service, while at the same time I maintain the appearance and solidity of a high bond ring.

I have found that rings made in this manner show only the slightest slippage when tested under the most severe conditions. The rings also have markedly superior electrical characteristics.

It is thought that the invention and numerous of its attendant advantages will be apparent from the foregoing description and it is obvious that numerous changes may be made in the form, construction and arrangement of the various parts without departing from the spirit and scope of the invention or sacrificing any of its material advantages.

Having thus described my invention, what I claim as new and desire to secure by Letters Patent is:

1. A molded mica product comprising superposed zones of mica plate compacted to ultimate form one of said zones having a relatively higher bond content than another.

2. A molded mica product comprising a relatively thick zone of mica plate of low bond content, a superposed thinner zone of mica plate of relatively high bond content.

3. A molded mica product comprising a sheet of mica plate having a bond content of not more than six percent by weight, and a superimposed sheet of mica plate having a bond content of not less than ten percent by weight.

4. A molded mica product having an outer relatively thin shell of relatively higher bond content than an adjacent portion.

5. A molded mica product having an outer shell of relatively high bond content and an inner portion consisting of relatively low bond content.

6. A mica insulating ring consisting of a retaining shell of relatively high bond content and an integral portion of relatively low bond content.

7. A mica insulating ring comprising a layer of bonded mica flakes having a relatively high bond content forming a relatively strong supporting frame work, and an adjacent integral layer of bonded mica flakes, having relatively low bond content, and consequently mechanically weak though electrically strong, supported by said frame.

8. A molded mica product comprising superposed layers of relatively high and relatively low bond content, the high bond layers forming a relatively strong support frame and the low bond layers being mechanically weak and supported by the frame.

9. The method of making molded mica products which comprises forming a sheet of mica plate having relatively low bond content and overlaying thereon a relatively thin sheet of mica plate having a relatively high bond content and compacting the superimposed sheets under heat and pressure so that the thin layer may form a retaining shell in the final product.

10. The method of making mica products which comprises forming a sheet of composite mica with a layer having a relatively high bond content and molding the material so that the relatively high bond content layer may form a retaining shell in the final product.

11. The method of making molded mica products, which comprises forming a sheet of mica plate having relatively low bond content, laying thereon a mica plate of relatively high bond content and compacting the superposed sheets under heat and pressure so that the high bond layer may form a retaining shell in the final product.

12. The method of making mica products with angularly disposed portions, which comprises forming a sheet of composite mica of relatively low bond content with angular portions disposed in intersecting planes and moulding a mica layer of relatively high bond content integrally unto a surface of one of said angularly disposed portions to re-enforce same.

13. The method of making mica products with angularly disposed portions, which comprises forming a sheet of composite mica of relatively low bond content with angular portions disposed in intersecting planes and moulding a mica layer of relatively high bond content to the surfaces of said intersecting portions to form a retaining frame or shell for supporting the relatively weak low bond layer in its moulded position.

14. The method of making flanged mica products, which comprises forming a flange in a sheet of mica plate having a relatively low bond content and consequently mechanical weak and moulding a sheet of mica, having a relatively high bond content and consequently mechanical strong, integrally onto the flange in order to re-enforce same.

15. The method of making flanged mica products, which comprises forming a flange in a sheet of mica plate having a relatively low bond content and consequently mechanical weak and moulding a sheet of mica, having a relatively high bond content and consequently mechanical strong, integrally onto the flange in order to re-enforce same and extending around and beyond the intersection of the flange to provide additional strength at the base of the flange.

16. A moulded mica article having a flanged portion and comprising a layer of relatively low bond content extending in the body of the article and in the flange and an integral mica layer of relatively high bond content and of consequent mechanical strength moulded onto the low bond mica forming the flange.

17. A flanged mica product comprising a layer of composite mica having a relatively low bond mica layer and of consequent mechanical weakness and an integral layer of relatively high bond moulded onto the lower bond layer to form a strengthening frame or shell to support the low bond layer.

In witness whereof, I have hereunto subscribed my name.

LEONARD L. HOWARD.